US008453529B2

(12) United States Patent
Birker et al.

(10) Patent No.: US 8,453,529 B2
(45) Date of Patent: Jun. 4, 2013

(54) GEARING FOR AN ADJUSTMENT DEVICE WITH COMPENSATION FOR PLAY

(75) Inventors: Stéphane Birker, Virginia Beach, VA (US); Michael Woehrle, Niedereschah (DE)

(73) Assignee: IMS Gear GmbH, Donaueschingen (DE)

( * ) Notice: Subject to any disclaimer, the term of this patent is extended or adjusted under 35 U.S.C. 154(b) by 742 days.

(21) Appl. No.: 12/121,718

(22) Filed: May 15, 2008

(65) Prior Publication Data

US 2008/0282822 A1    Nov. 20, 2008

(30) Foreign Application Priority Data

May 16, 2007    (DE) ................. 10 2007 023 329

(51) Int. Cl.
F16H 1/24    (2006.01)
F16M 13/00    (2006.01)

(52) U.S. Cl.
USPC ................. 74/89.23; 74/424.74; 248/429

(58) Field of Classification Search
USPC ............. 384/129, 215, 275, 276, 280, 282, 384/295, 296, 297; 74/425, 89.23, 424.71, 74/427, 89.36, 89.14, 89.4, 89.42, 426; 248/429, 248/422, 231.85
See application file for complete search history.

(56) References Cited

U.S. PATENT DOCUMENTS

| | | | | |
|---|---|---|---|---|
| 4,295,691 A | * | 10/1981 | Rubenthaler | 384/297 |
| 4,678,349 A | * | 7/1987 | Yoshigai | 384/125 |
| 4,951,349 A | * | 8/1990 | Dietrich et al. | 16/228 |
| 5,048,786 A | * | 9/1991 | Tanaka et al. | 248/429 |
| 5,112,144 A | * | 5/1992 | Law | 384/215 |
| 5,146,805 A | * | 9/1992 | Harkrader et al. | 74/473.31 |
| 5,330,273 A | * | 7/1994 | Tsai | 384/215 |
| 5,797,293 A | * | 8/1998 | Chaban | 74/89.36 |
| 6,915,998 B2 | * | 7/2005 | Borbe et al. | 248/429 |
| 6,971,620 B2 | * | 12/2005 | Moradell et al. | 248/422 |
| 7,051,986 B1 | * | 5/2006 | Taubmann et al. | 248/429 |
| 7,143,513 B2 | * | 12/2006 | Taubmann et al. | 29/893.1 |
| 7,340,974 B2 | * | 3/2008 | Landskron et al. | 74/425 |
| 7,437,962 B2 | * | 10/2008 | Taubmann et al. | 74/89.1 |
| 7,703,347 B2 | * | 4/2010 | Porinsky et al. | 74/441 |
| 7,731,266 B2 | * | 6/2010 | Selle | 296/107.01 |
| 2006/0249644 A1 | | 11/2006 | Folliot | |
| 2007/0104401 A1 | * | 5/2007 | Kirchhof et al. | 384/275 |

FOREIGN PATENT DOCUMENTS

| | | |
|---|---|---|
| CN | 101 307 817 | 7/2011 |
| DE | 3325248 A1 | 2/1984 |
| DE | 4414020 C1 | 6/1995 |
| DE | 10230514 B4 | 1/2004 |

(Continued)

OTHER PUBLICATIONS

German Office Action dated Jan. 17, 2008, 4 pages.

(Continued)

Primary Examiner — Alan Waits
(74) Attorney, Agent, or Firm — Andrew F. Young, Esq.; Lackenbach Siegel, LLP

(57) ABSTRACT

The invention concerns a gearing for an adjustment device, especially an automotive adjustment device. Included is a threaded spindle as well as a spindle nut sitting on the threaded spindle, while inside a housing of the gearing. On either side of the spindle nut, there is provided a bearing bush to mount the spindle nut inside the gearing housing, while at least one of the bearing bushes consists of flexible material and is clamped under prestressing between the gearing housing and the spindle nut.

13 Claims, 5 Drawing Sheets

FOREIGN PATENT DOCUMENTS

| | | |
|---|---|---|
| DE | 10308028 A1 | 9/2004 |
| DE | 10337475 A1 | 3/2005 |
| DE | 102004059538 B3 | 1/2006 |
| DE | 102005001333 A1 | 7/2006 |
| DE | 102006011718 A1 | 10/2006 |
| DE | 10 2006 011 718 | 9/2010 |
| JP | 6-159356 | 6/1994 |
| JP | 06159356 A * | 6/1994 |

OTHER PUBLICATIONS

Full English Translation of Hata JP 6-159356 (5 pages).
Translation of Certificate for Patent from China for ZL200810099240.6 (1-page), English, (Jul. 27, 2011).
Letter re. EP 1 992 842 prosecution (Agent to EPO) and amended claim page (3 pages), (Oct. 9, 2009).

* cited by examiner

GEARING FOR AN ADJUSTMENT DEVICE WITH COMPENSATION FOR PLAY

CROSS REFERENCE TO RELATED APPLICATIONS

This application claims priority to DE 10 2007 023 329.0 filed May 16, 2007, the entire contents of which are herein incorporated fully by reference.

FIGURE SELECTED FOR PUBLICATION

FIG. 1

BACKGROUND OF THE INVENTION

1. Field of the Invention

The present invention relates to gearing for an adjustment device. More specifically, the present invention relates to an automotive adjustment device with compensation for play.

2. Description of the Related Art

The related art involves an automotive adjustment device known, for example, from DE 10 2004059538 B3. The gearing has a threaded spindle as well as a spindle nut sitting on the threaded spindle. Inside the gearing housing, on either side of the spindle nut, is provided a bearing bush to hold the spindle nut inside the gearing housing.

As a detriment to this design, in order to achieve a mounting of the spindle nut in the housing free of play, a specially configured bearing bush is provided. The bearing bush lies with its bearing shoulder against the end face of the spindle nut. By its tubular bearing segment, each bearing bush protrudes through a continuous opening of the housing, in which the spindle nut is accommodated.

The tubular segment of the bearing bush projects from the continuous opening of the gearing housing and thrusts against a further support, which is configured, e.g., as a U-clamp, while an elastic element is interposed between the additional support and the end of the tubular bearing segment. In this way, the spindle nut is elastically stressed. The bearing bush can move axially. As a further detriment, this solution requires a specially configured bearing bush, which projects through the wall of the gearing housing. Furthermore, an additional elastic component is needed to provide for an elastic prestressing.

Another gearing for an automotive seat adjustment device is known from DE 10 2005 001 333 A1. Here, again, a spindle nut sitting on a spindle is arranged between two bearing bushes inside a gearing housing. For noise reduction, these bearing bushes have a guide segment for guiding the spindle nut and a guide segment for guiding the threaded spindle. For this, the cylindrical bearing segment of the bearing bush is outfitted with a varying internal diameter, for example.

OBJECTS AND SUMMARY OF THE INVENTION

An object of the invention is to indicate a very simple gearing for an adjustment device wherein a possibility for providing a no-play or largely no-play mounting of a spindle nut inside the gearing housing exists, without having to use extra structural elements that sit outside of the gearing housing and thus increase the footprint needed for such a gearing.

The present invention relates to a gearing for an adjustment device, especially an automotive adjustment device. Included is a threaded spindle as well as a spindle nut sitting on the threaded spindle, while inside a housing of the gearing. On either side of the spindle nut, there is provided a bearing bush to mount the spindle nut inside the gearing housing, while at least one of the bearing bushes consists of flexible material and is clamped under prestressing between the gearing housing and the spindle nut.

The above, and other objects, features and advantages of the present invention will become apparent from the following description read in conduction with the accompanying drawings, in which like reference numerals designate the same elements.

BRIEF DESCRIPTION OF THE DRAWINGS

The invention shall be discussed more closely hereafter in connection with 13 Figures. These show.

DETAILED DESCRIPTION OF THE PREFERRED EMBODIMENTS

Figure 1:
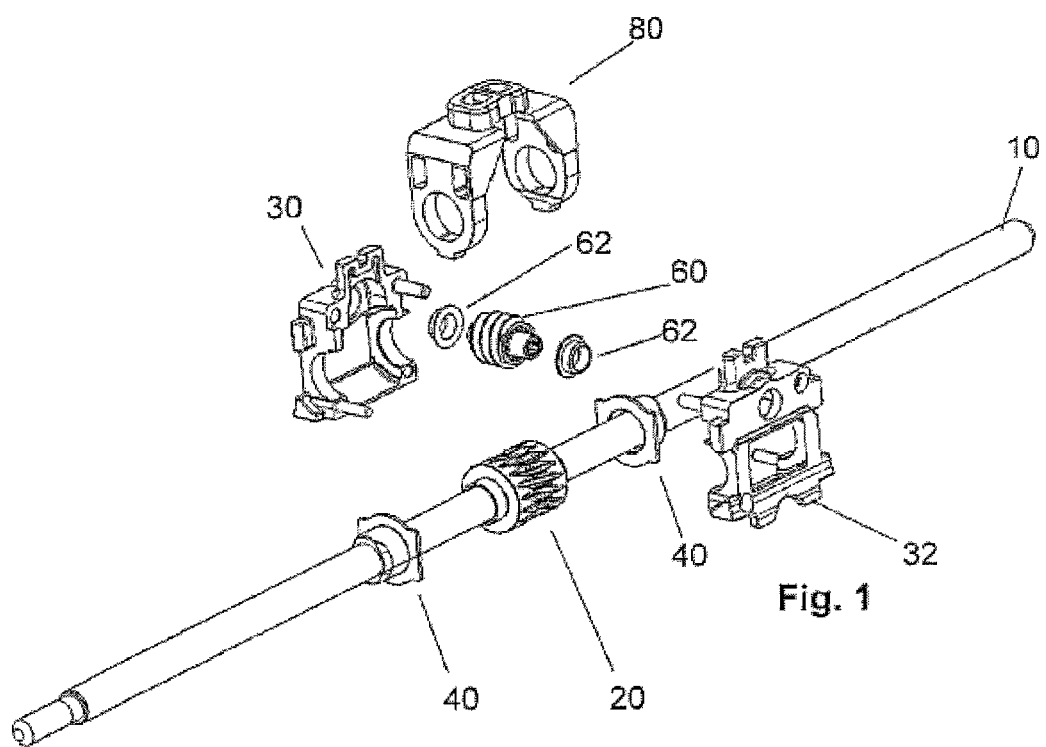
FIG. 1, an exploded perspective view of a sample embodiment of the gearing of the invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale.

FIG. 1 shows a perspective view of a sample embodiment of the gearing of the invention in exploded view. On a threaded spindle 10 is arranged a spindle nut 20, which can be placed in rotation by a drive worm 60, which can be driven by an electric motor. Thanks to a rotation of the spindle nut 20, it can move in the axial direction on the threaded spindle 10. The spindle nut 20 and the drive worm 60 are mounted, able to rotate, in a housing assembled from two housing pieces 30, 32.

The mounting of the spindle nut 20 occurs via bearing bushes 40 (or alternatively called bush bearing), which are suitably arranged in the housing. Likewise, the mounting of the drive worm 60 occurs via suitably arranged bearing bushes 62. FIG. 1 furthermore shows an elastic shell 80, which encloses the assembled housing from the top.

Figure 2:
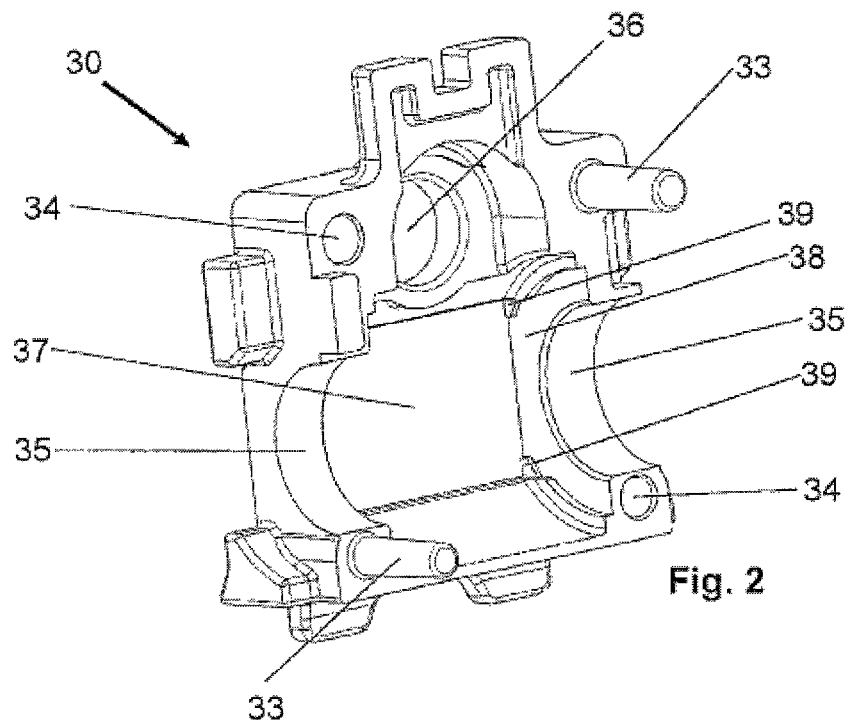
FIG. 2, a piece of the housing of the gearing of FIG. 1 in perspective view, looking at the inside of the housing piece.

FIG. 2 shows a housing piece 30 of the housing of the gearing of FIG. 1 in perspective representation, looking at the inside of the housing piece 30. The housing pieces 30, 32 are molded as so-called identical parts, which means that two identical housing parts 30, 32 are used to assemble one housing. As is shown in FIG. 2, one housing piece 30 has an essentially rectangularly shaped cross section, on which pins 33 are arranged at two diagonally opposite corners. At the two remaining corners of the housing piece 30, again being diagonally opposite, there are arranged openings 34 with which the pins 33 engage when assembling two housing pieces 30, 32, and which line up and join together the housing pieces 30, 32. In the lower part of the housing piece 30 there is a recess 37 to receive the spindle nut 20 in the axial direction.

The recess 37 is bounded by contact surfaces 38 front and rear in the axial direction. The contact surfaces 38 have a semicircular opening 35 in the axial direction, by which the threaded spindle 10 is guided in the assembled condition. Furthermore, the contact surfaces 38 have two roughly triangular thickenings 39, which are placed on the contact surfaces 38 at the height of the upper and lower limit of the recess 37 and outside of a diameter of the spindle nut 20. In the upper region, the housing piece 30 has another opening 36 transversely to the axial direction of the spindle nut, being suitably configured to receive a bearing bush 62 to mount the drive worm 60.

Figure 3:
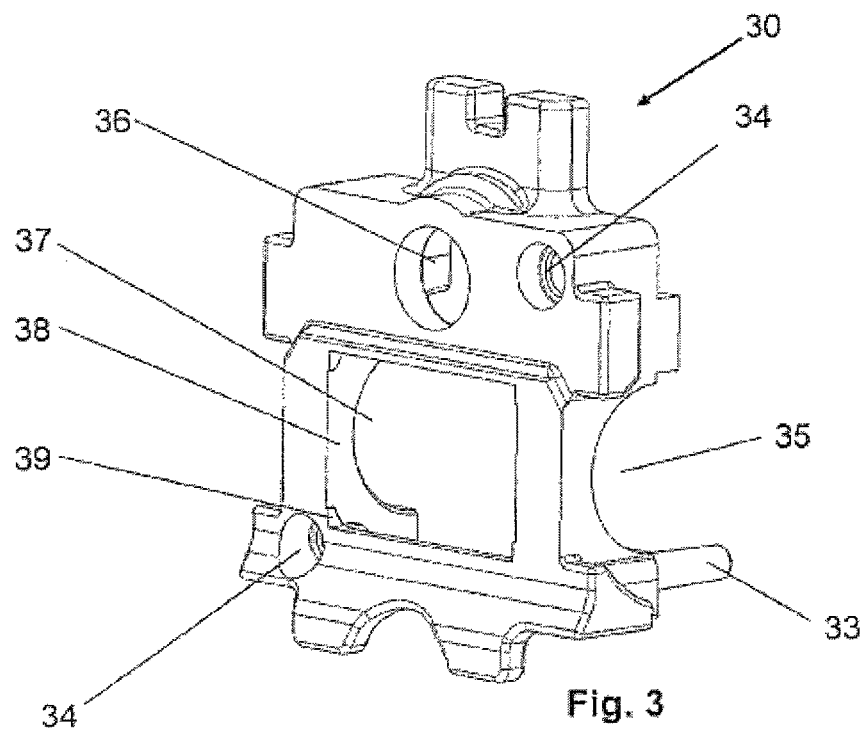
FIG. 3, a perspective view of the housing piece of FIG. 2, looking at the outside of the housing piece.

FIG. 3 shows a perspective representation of the housing piece 30 from FIG. 2, looking at the outside of the housing piece 30. In this view, the pins 33 and openings 34 described in FIG. 2 for assembling the two housing pieces 30, 32 can again be seen. Through the recess 37 to accommodate the spindle nut 20, one can also see one of the contact surfaces 38 with the thickenings 39 arranged on the contact surface 38. In the upper part of the housing piece 30, in the middle, is arranged the opening 36 described in FIG. 2 to mount the drive worm 60.

Figure 4:
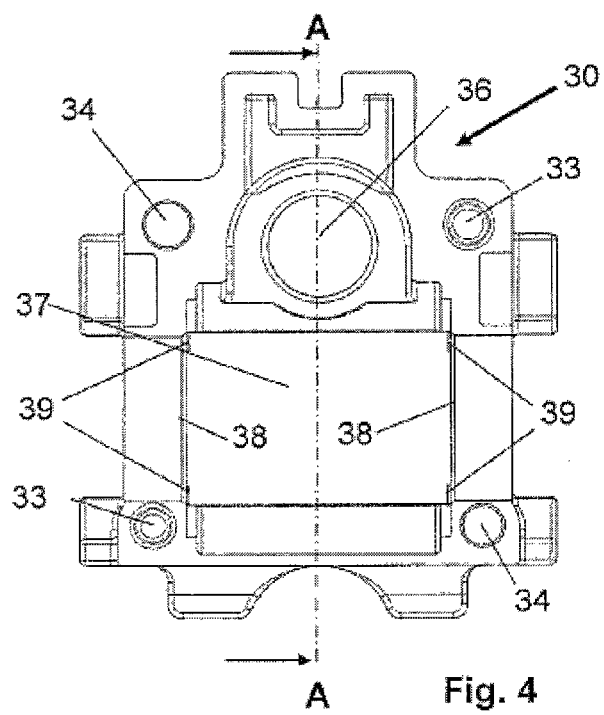
FIG. 4, a top view of the housing piece shown in FIG. 2 and FIG. 3, looking at the inside of the housing piece.

FIG. 4 shows a side view of the housing piece 30 from FIGS. 2, 3, looking at the inside of the housing piece 30. In the view shown in FIG. 4, the rectangular recess 37 to accommodate the spindle nut 20 is especially well seen, being bounded front and rear by the contact surfaces 38 in the axial direction. In particular, the thickenings 39 placed on the contact surfaces 38 are especially evident in this view, standing out as projections.

Figure 5:
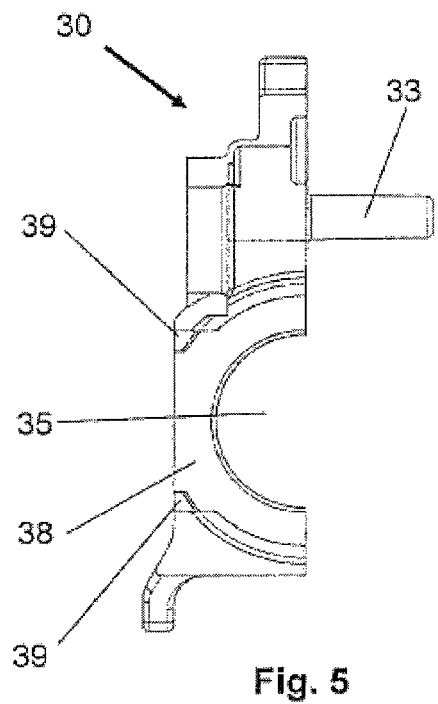
FIG. 5, a cross section along section line A-A of the housing piece of FIG. 4.

FIG. 5 shows a cross section along line A-A of the housing piece 30 of FIG. 4. In this representation of the housing piece 30, the contact surface 38 with the semicircular opening 35 is especially well seen. Likewise well seen are the thickenings 39, approximately triangular in plan view, which are arranged on the outer margin of the contact surface, at the upper and lower end, respectively, of the recess 37. The thickenings 39 are each provided with a bevel toward the inside of the housing 30, so that a platelike bearing shoulder 41 of the bearing bush 40 can be shoved across the bevel when putting the gearing together.

Figure 6:
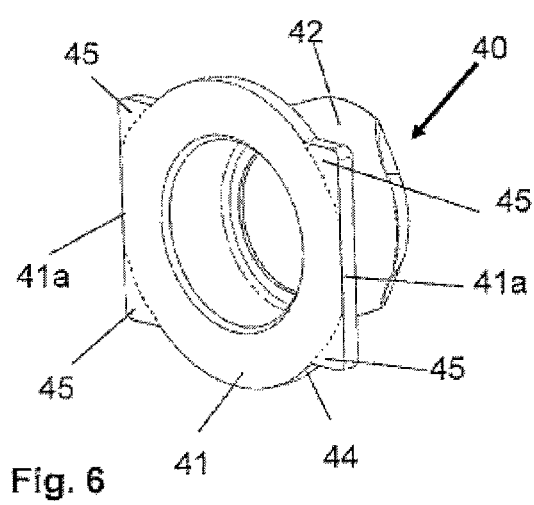
FIG. 6, a perspective view of the bearing bush used in the gearing of FIG. 1 for mounting the spindle nut in the gearing housing, in perspective representation, FIG. 7, a side view of the bearing bush of FIG. 6.

FIG. 6 shows a perspective view of the bearing bush 40 used in the gearing of FIG. 1 to mount the spindle nut 20 in the gearing housing. The bearing bush 40 consists of a platelike bearing shoulder 41 and a tubular bearing segment 42 arranged on the platelike bearing shoulder 41. The platelike bearing shoulder 41 is fashioned approximately as a circle and has approximately triangular projecting regions 45 arranged on the bearing shoulder 41 on the outer side, which extend in particular beyond the diameter of the spindle nut 20.

The bearing shoulder 41, furthermore, has a circular opening in the region of the tubular bearing segment 42, formed as a single piece with it, so that the bearing shoulder 41 is arranged essentially as an annular region 44 at one end of the tubular bearing segment 42. The bearing bush 40 is dimensioned so that the platelike bearing shoulder 41 in the mounted condition of the gearing coincides with the contact surfaces 38 and the projecting regions 45 are arranged in the region of the thickenings 39. The annular region 44 of the bearing shoulder 41 is dimensioned so that it has an outer diameter corresponding to the outer diameter of the spindle nut.

As can be seen from FIG. 6, the projecting regions 45 are situated at the annular region 44 of the bearing shoulder 42 so that two outer edges 41a are produced, being arranged parallel to each other and tangential to the annular region 44. The bearing bush 40 is fabricated as a single plastic piece, for example.

Figure 7:
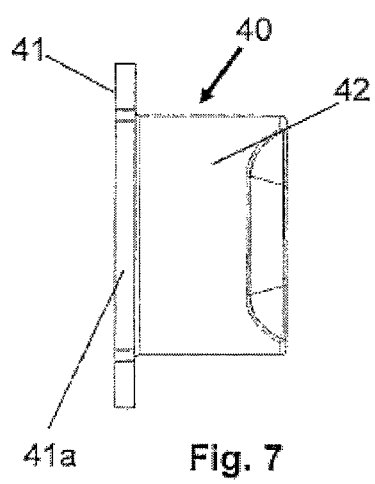

FIG. 7 shows a side view of the bearing bush 40 from FIG. 6. Especially well seen in this view is the platelike bearing shoulder 41 and the tubular bearing segment 42 arranged on this bearing shoulder.

Figure 8:
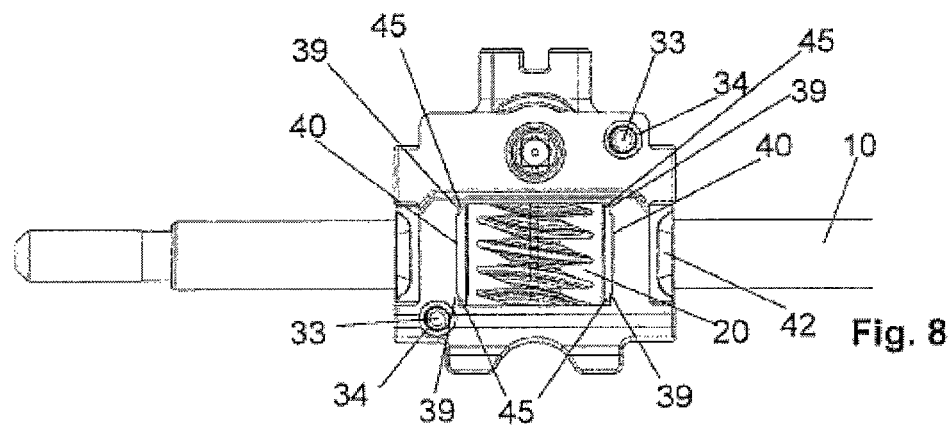
FIG. 8, a side view of the assembled gearing of FIG. 1.
Figure 9:
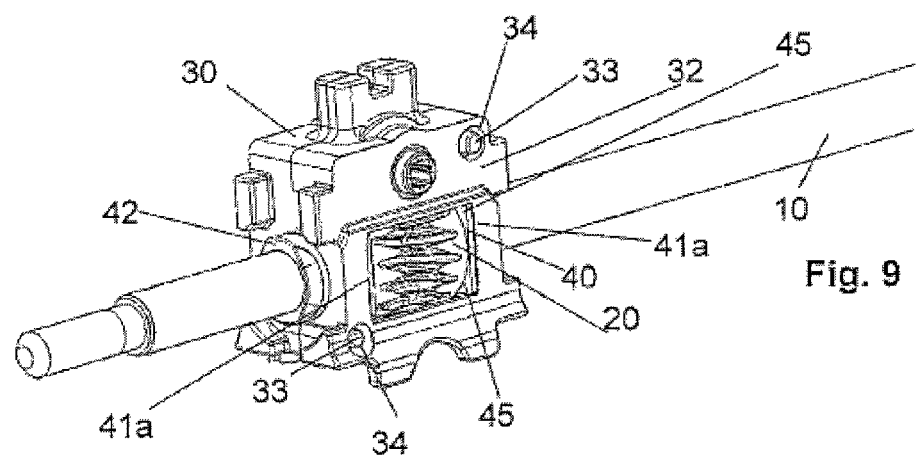
FIG. 9, a perspective representation of the assembled gearing of FIG. 8.

FIG. 8 shows a side view of the assembled gearing from FIG. 1. The spindle nut 20 is mounted in the housing 30, 32 by means of the bearing bushes 40. The tubular bearing segments 42 will come to lie in a circular opening of the housing 30, 32, formed from the semicircular openings 35, as can be seen in FIG. 9. The threaded spindle 10 is led through the bearing bush 40 and the spindle nut 20. It is especially well seen in the view from FIG. 8 that the projecting regions 45 in the assembled condition of the gearing are arranged so that they sit in the recess 37 on the thickenings 39 in the axial direction. As is especially well seen in FIG. 9, the outer edges 41a of the bearing shoulder 41 are flush with the housing pieces 30, 32 on the outer side.

Figures 10, 11:
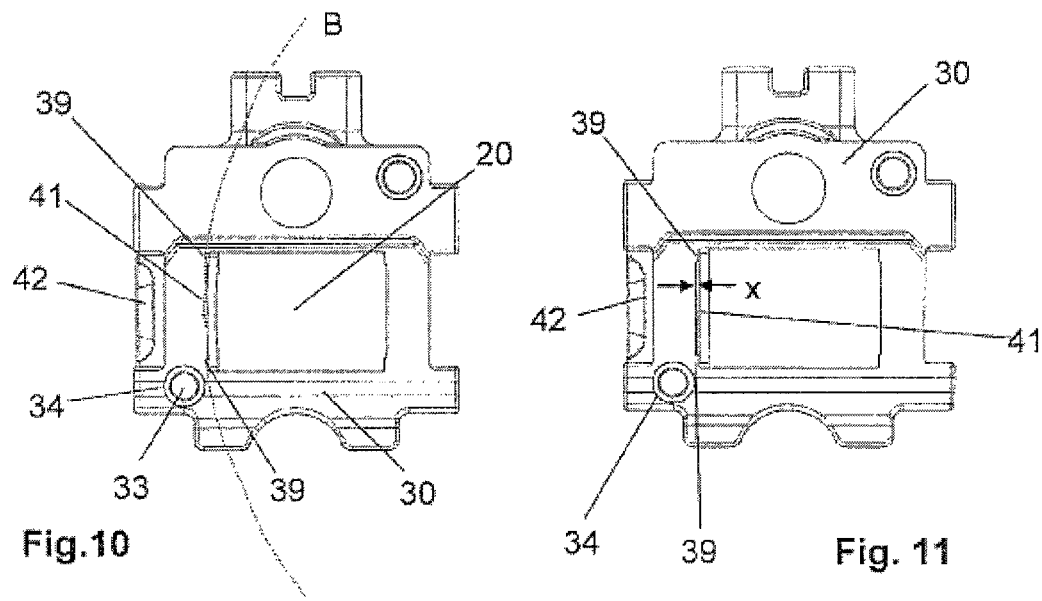
FIG. 10, a detail view of the assembled gearing of FIGS. 8 and 9 in the region of the elastically deformed bearing bush in a side view, for better visibility without detailed representation of the spindle nut.
FIG. 11, a detail view of the gearing of FIG. 10 in side view with spindle nut not yet installed and thus the bearing bush is not deformed.

FIG. 10 shows a representation of the assembled gearing from FIGS. 8 and 9 in the region of the elastically deformed bearing bush 40 in a side view. hi this side view of the assembled gearing, it is especially well seen that the platelike bearing shoulder 41 is under a prestressing in the finally assembled gearing and runs along a line of flexure B, as shown. The prestressing of the bearing shoulder 41 is achieved in that the contact surfaces 38 are arranged at a distance from each other, corresponding to the sum of the length of the spindle nut 20 and twice the thickness of the platelike bearing shoulder 41. Because the projecting regions 45 come to lie against the thickenings 39, a prestressing of the platelike bearing shoulder 41 is produced, which prevents any play in the mounting of the spindle nut 20.

In FIG. 11, the gearing from FIG. 10 is represented with the spindle nut 20 not yet installed. If the bearing bush 40 is inserted into the gearing housing 30, 32 in its relaxed state, the bearing shoulder 41 will come to lie against the thickenings 39 with its projecting regions 45. There will remain a gap between the annular region 44 of the bearing shoulder 41 and the contact surface 38 at the height of the thickenings 39, which defines the possible spring travel X of the bearing bush 40. By installing the spindle nut 20, the bearing shoulder 41 will be forced against the contact surface 38 between the thickenings 39, becoming thus prestressed along the aforementioned line of flexure B. It should be noted here that the invention is not limited to the thickenings 39 being arranged on the housing. For example, it is also possible to provide the thickenings 39 directly on the projecting regions 45 of the bearing shoulder 41.

Figure 12:
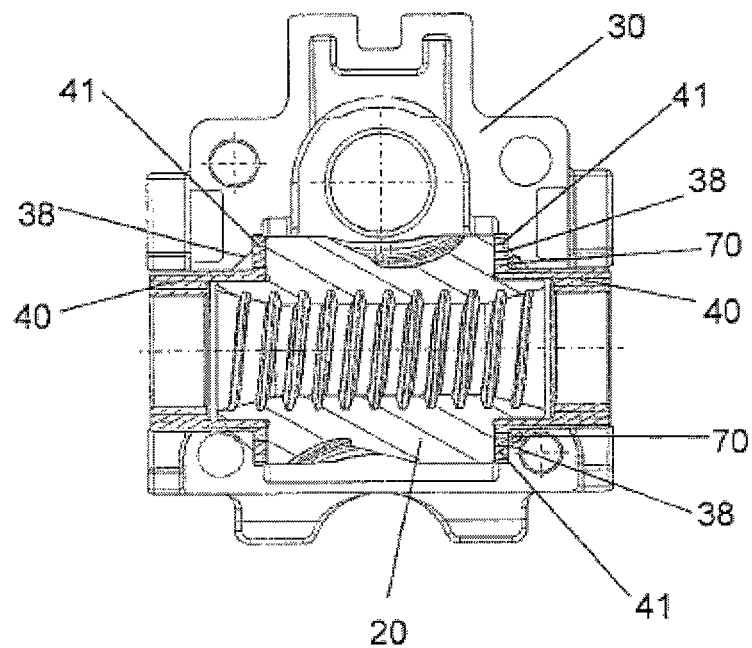
FIG. 12, a longitudinal section through a second embodiment of the gearing of the invention.

FIG. 12 shows a longitudinal section of another sample embodiment of the gearing of the invention. In this embodiment, a prestressing of the bearing bush 40 is achieved not by thickenings 39, but instead by a tension ring 70, which is arranged between the bearing bush 40 and the contact surface 38. By a beveling of the contact surfaces 38, one ensures that the tension ring 70 comes to lie in optimal position relative to the bearing bush 40, and a force is produced in both the axial and the radial direction of the bearing bush 40. The rest of the construction of the gearing corresponds to that of the above described sample embodiment and therefore will not be set forth further.

Figure 13:
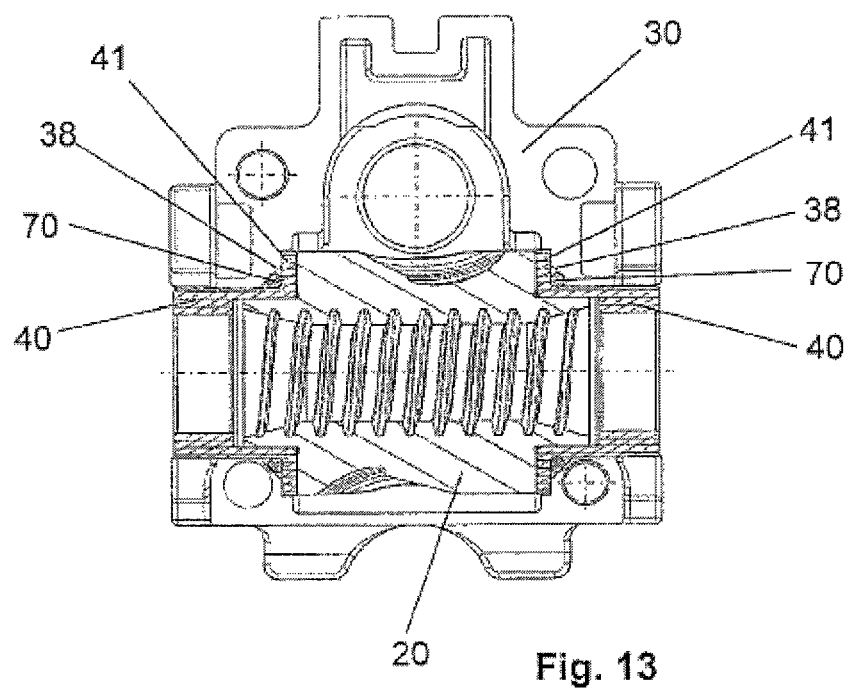
FIG. 13, a longitudinal section through a third sample embodiment of the gearing of the invention.

FIG. 13 shows the gearing from FIG. 12, with a tension ring 70 provided on the bearing bushes 40 at either side of the spindle nut 20.

LIST OF REFERENCE NUMBERS

10 threaded spindle
20 spindle nut
30 housing piece
32 housing piece
33 pin
34 opening
35 opening
36 opening
37 recess
38 contact surface
39 thickening
40 bearing bush
41 platelike bearing shoulder
41a outer edge
42 tubular bearing segment
44 annular region
45 projecting region
60 drive worm
62 bearing bush
70 tension ring
80 elastic shell
B line of flexure
X spring travel Having described at least one of the preferred embodiments of the present invention with reference to the accompanying drawings, it is to be understood that the invention is not limited to those precise embodiments, and that various changes, modifications, and adaptations maybe effected therein by one skilled in the art without departing from the scope or spirit of the invention as defined in the appended claims.

What is claimed is:

1. A gearing assembly for an adjustment device, comprising:
    a spindle nut on a threaded spindle;
    said threaded spindle extending along a central axial direction;
    a gearing housing operatively bounding said spindle nut;
    a first and a second bearing bush bounding said threaded spindle on opposing sides of said spindle nut and mounting said spindle nut inside said gearing housing;
    at least one of said bearing bushes further comprising:
    a planar bearing shoulder extending away from a tubular bearing segment of said at least one of said bearing bushes;
    at least one projection region extending unitarily outwardly from said planar bearing shoulder of said at least one of said bearing bushes along a plane perpendicular to said central axial direction during an initial assembly and beyond a diameter of said spindle nut;
    wherein said at least one of said bearing bushes is formed of a flexible material and is clamped during mounting under a prestressing between said gearing housing and said spindle nut;
    means for deflecting said at least one projection region away from said plane perpendicular to said central axial direction, thereby minimizing play in said mounted spindle nut;
    said means for deflecting includes at least one thickened portion being on one of said contact surface of said gearing housing and said projection at least one projection region of said at least one bearing bush; and
    said at least one thickened portion is located beyond a diameter boundary defined by a diameter of said spindle nut thereby enabling a prestressing between said gearing housing and said spindle nut by deflecting said at least one projection region of said at least one of said bearing bushes during said mounting of said spindle nut away from said contact surface.

2. A gearing assembly for an adjustment device, comprising:
    a spindle nut on a threaded spindle;
    said threaded spindle extending along a central axial direction;
    a gearing housing operatively bounding said spindle nut;
    a first and a second bearing bush bounding said threaded spindle on opposing sides of said spindle nut and mounting said spindle nut inside said gearing housing;
    at least one of said bearing bushes further comprising:
    a planar bearing shoulder extending away from a tubular bearing segment of said at least one of said bearing bushes;
    at least one projection region extending outwardly from said planar bearing shoulder of said at least one of said bearing bushes along a plane perpendicular to said central axial direction during an initial assembly and beyond a diameter of said spindle nut; and
    wherein said at least one of said bearing bushes is formed of a flexible material and is clamped during mounting under a prestressing between said gearing housing and said spindle nut thereby deflecting said at least one projection region away from said plane perpendicular to said central axial direction, thereby minimizing play in said mounted spindle nut,
    a prestressing thickening portion arranged extending unitarily from a contact surface of said gearing housing, and said planar bearing shoulder of said at least one of said bearing bushes pressing said at least one projection region of said at least one of said bearing bushes in a direction of said spindle nut during said mounting.

3. A gearing assembly for an adjustment device according to claim 2, wherein:
    said planar bearing shoulder includes four of said projection regions; and
    said gearing housing includes said contact surface arrayed perpendicularly to said central axial direction to support said planar bearing shoulder of said at least one bearing bush during said mounting of said spindle nut.

4. A gearing assembly for an adjustment device according to claim 3, wherein:
    said thickening portion is on one of said contact surface of said gearing housing and said projection region of said at least one bearing bush; and
    said thickening portion is located beyond a diameter boundary defined by a diameter of said spindle nut thereby enabling a prestressing between said gearing housing and said spindle nut by deflecting said projection region of said at least one of said bearing bushes during said mounting of said spindle nut away from said contact surface.

5. A gearing assembly for an adjustment device, comprising:
   a spindle nut on a threaded spindle;
   said threaded spindle extending along a central axial direction;
   a gearing housing containing opposing first and second gearing housing members for mounting said spindle nut relative to said gearing housing, said gearing housing including a first contact surface arrayed perpendicularly to said central axial direction to support a planar bearing shoulder of a first bearing bush and a second contact surface arrayed perpendicularly to said central axial direction to support a planar bearing shoulder of a second bearing bush during said mounting of said spindle nut;
   said first and said second bearing bushes bounding said threaded spindle on opposing sides of said spindle nut and mounting said spindle nut inside said gearing housing;
   a prestressing thickening portion extending unitarily from each of said contact surfaces and arranged between the respective contact surfaces and said respective planar bearing shoulders of said bearing bushes flexing at least one projection region of said bearing bushes in a direction of said spindle nut during said mounting;
   wherein said bearing bushes are formed of a flexible material and clamped under a prestressing between said gearing housing and said spindle nut, thereby preventing a play in said mounted spindle nut;
   and wherein each of said bearing bushes comprises said planar bearing shoulder extending away from a tubular bearing segment and said at least one projecting region extending outwardly from said planar bearing shoulder beyond a diameter of said spindle nut.

6. A gearing assembly for an adjustment device according to claim 5, wherein:
   said planar bearing shoulders includes a plurality of said projecting regions.

7. A gearing assembly for an adjustment device according to claim 5, wherein:
   each of sad prestressing thickening portions is beyond a diameter of said spindle nut thereby enabling said prestressing between said gearing housing and said spindle nut by deflecting said at least one projection region of said bearing bushes during said mounting of said spindle nut away from said contact surface.

8. A gearing assembly for an adjust device according to claim 5, wherein:
   said prestressing thickening portions each engage solely with said at least one projection region of said respective bearing bushes, thereby enabling said prestressing between said gearing housing and said spindle nut during said mounting.

9. A gearing assembly for an adjustment device according to claim 5, wherein:
   each of said prestressing thickening portions arranged between said contact surface and said planar bearing shoulder is a ring member.

10. A gearing assembly for an adjustment device according to claim 5, further comprising:
    an elastic shell member;
    said elastic shell member bounding said first and said second gearing housing members of said gearing housing during said mounting.

11. A gearing assembly for an adjustment device according to claim 5, further comprising:
    a first and a second parallel straight-line outer edge portion on each of said planar bearing shoulders.

12. A gearing assembly for an adjustment device according to claim 11, wherein:
    each said outer edge portion is parallel to an outer wall of said gearing housing following said mounting.

13. A gearing assembly for an adjustment device according to claim 5, wherein:
    said at least one projection region extending outwardly from said respective planar bearing shoulders of said bearing bushes is deformed at an angle away from a plane perpendicular to said central axial direction during said mounting.

* * * * *